United States Patent [19]

O'Brien et al.

[11] 4,018,099
[45] Apr. 19, 1977

[54] MULTISPEED SHIFT LINKAGE CONTROL

[75] Inventors: Patrick H. O'Brien, Birmingham; William J. Zabritski, Sterling Heights, both of Mich.

[73] Assignee: General Motors Corporation, Detroit, Mich.

[22] Filed: Sept. 15, 1975

[21] Appl. No.: 613,332

[52] U.S. Cl. .................................. 74/473 R; 74/476
[51] Int. Cl.² ........................ G05G 5/02; G05G 9/12
[58] Field of Search ........................... 74/473 R, 476

[56] References Cited
UNITED STATES PATENTS

| | | | |
|---|---|---|---|
| 1,250,355 | 12/1917 | Robinson et al. | 74/476 |
| 1,886,848 | 11/1932 | Tenney | 74/473 R |
| 1,951,876 | 3/1934 | Lapsley | 74/476 X |
| 2,172,663 | 9/1939 | Manning | 74/473 R |
| 2,892,358 | 6/1959 | Backus et al. | 74/473 R |
| 3,354,741 | 11/1967 | Johnston, Jr. et al. | 74/477 |
| 3,364,779 | 1/1968 | Cambria | 74/473 |
| 3,496,797 | 2/1970 | Stott et al. | 74/476 |
| 3,499,345 | 3/1970 | Hobbins et al. | 74/473 |

FOREIGN PATENTS OR APPLICATIONS 946,867  12/1948  France .................................. 74/473

*Primary Examiner*—Allan D. Herrmann
*Attorney, Agent, or Firm*—A. M. Heiter

[57] ABSTRACT

A transmission shift lever assembly having a manually operated shift lever, pivotally mounted by a sliding saddle block connection on a shift shaft for transverse selecting movement between first, second and third neutral positions and rotating the shift shaft to these neutral positions and pivotally mounted for limited selecting movement in a pivot bracket pivotally mounted for shifting movement on the housing for fore and aft shifting movement conjointly with the pivot bracket from any neutral position in either direction to a drive position without turning movement. Cooperating blocking and unblocking cams on the shift lever and a spring-centered rotary inhibitor acting on a selecting movement of the shift lever from second neutral position to first neutral position to rotate the rotary inhibitor to unblocking position permitting shifting movement of the shift lever to either first or reverse drive positions and acting on a shift from first drive position to first neutral position to rotate the rotary inhibitor to blocking position blocking shift movement to reverse drive position and compelling selecting movement to second neutral position.

5 Claims, 6 Drawing Figures

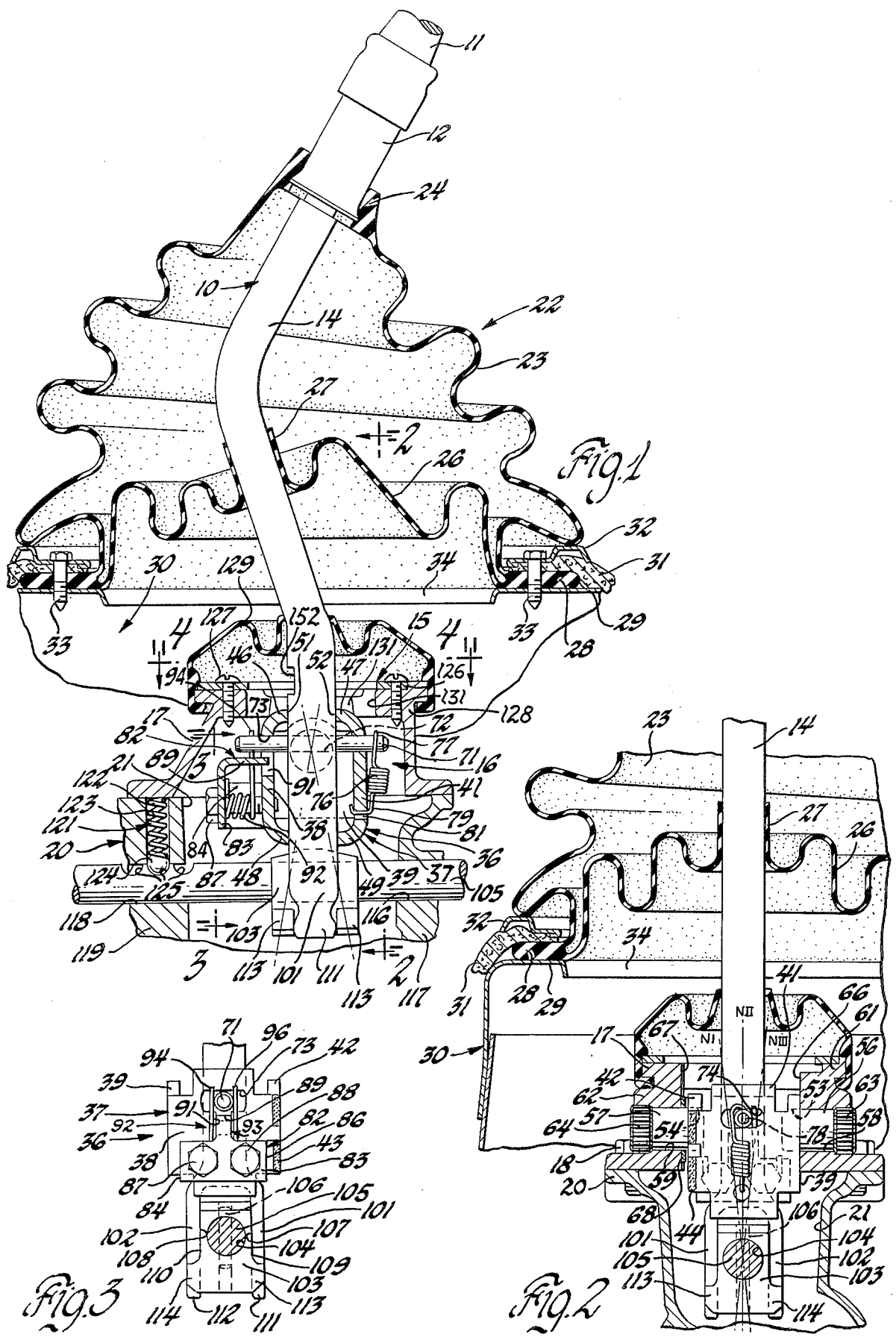

MULTISPEED SHIFT LINKAGE CONTROL

This invention relates to transmisson shift control linkages and particularly a pivotally mounted hand operated shift lever.

SUMMARY OF INVENTION

The shift lever is pivotally mounted at the end opposite the hand grip on the shift shaft for lateral selecting movement of the shift lever and conjoint rotation of the shift shaft between a plurality of neutral positions and is pivotally mounted at an intermediate point for axial shifting movement from each neutral position with conjoint axial movement of the shift shaft in opposite directions to one and another drive position. The shift lever at the selecting pivot end has a fork with tines having parallel large flat internal guide bearing surfaces engaging the parallel flat external surfaces of a block secured to the shift shaft for accurate rigid conjoint selecting and shifting movement of the shift lever and shaft. The shift lever at the shifting movement pivot is mounted in a pivot bracket which has spaced guides and positioning pin and slot connection so the shift lever and pivot bracket have conjoint shifting movement and relative selecting movement. The pivot bracket is pivotally mounted on trunions fixed on the support housing. A centering member fixed on the pivot bracket and a pair of centering springs engaging the centering member and the positioning pin to center the shift lever in one neutral position.

An automatic position stop inhibitor permits a shift of the shift lever and controlled shift linkage from a normal second neutral position to a first neutral position and subsequently in opposite directions to either the reverse drive position or the first forward drive position but inhibits a shift of the shift lever from the first forward drive position to reverse drive position at the first neutral position and guides the shift lever toward the normal second neutral position. The inhibitor has a cam member rotatably mounted on a pin and biased by opposed fingers of a coil centering spring engaging a center stop to a normal central position and having an uninhibiting cam surface and a stop or inhibiting cam surface cooperating respectively with an uninhibiting cam surface and an inhibiting cam surface on the shift lever. When the shift lever is moved with selecting movement from the second neutral position to the first neutral position, the uninhibiting cam surfaces on the shift lever and the rotary cam engage to rotate in one direction the rotary cam to uninhibiting position to permit subsequent shift movement of the shift lever to either first or reverse drive position. When the shift lever is moved with shifting movement to first drive position, the rotary cam is returned to the central position by the centering spring and on subsequent shift movement from first drive position the inhibiting cam surfaces on the shift lever and rotary cam engage to block or inhibit movement of the shift lever past first neutral position into reverse and to oppositely rotate the rotary cam to an inhibiting guide stopped position to guide the shift lever to the second neutral position for a subsequent shift to second drive position or other drive positions as desired by the operator.

These and other features of the invention will be more apparent from the following description of a preferred embodiment and the drawings.

FIG. 1 is a partial side sectional view of the shift linkage assembly.

FIG. 2 is a partial rear sectional view of the shift linkage assembly.

FIG. 3 is a partial front sectional view showing details of the centering springs and pivot structure of the shift linkage assembly.

Figure 4:
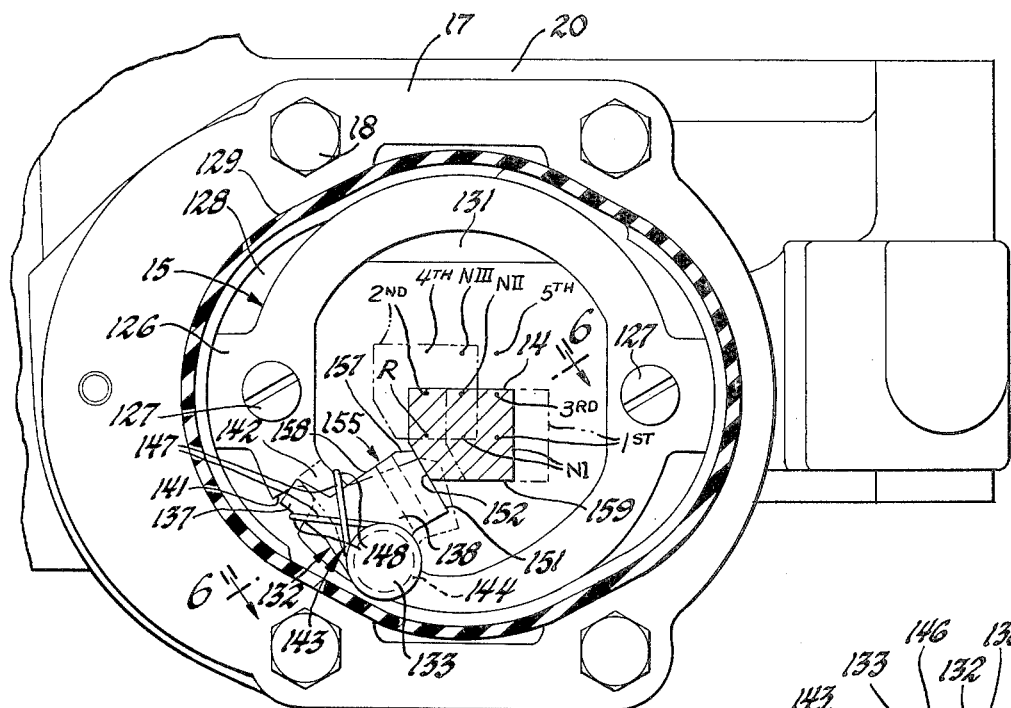
FIG. 4 is a partial sectional view of FIG. 1 on the line 4—4 showing the inhibitor operation on a shift from neutral drive position to reverse drive position.
Figure 6:
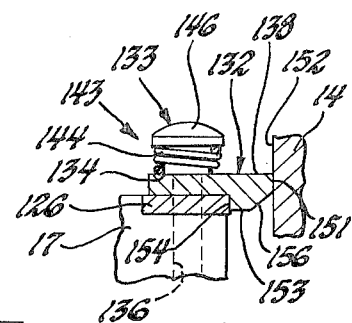
FIG. 6 is a partial sectional view of FIG. 4 on the line 6—6 showing the rotary inhibitor in inhibiting position.

The invention relates to a shift lever linkage assembly having a pivot assembly 16 to firmly and freely pivotally mount the shift lever and pivotally connect the shift lever to the shift shaft and an inhibitor assembly 15 to automatically prevent shifting into reverse drive position in response to shift lever movement directly from the first drive position. The shift lever assembly 10 has an upper portion 11 having at the top end, not shown, a conventional hand knob or grip connected by a rubber isolator 12 to the lower portion 14. The isolator 12 is a conventional construction having a rubber sleeve press fitted between a sleeve on one member, the upper hand shift lever portion 11 and a rod member, the lower hand shift lever portion 14 and fixing these lever portions together and damping vibration of the upper portion and thus not shown in detail. The lower portion 14 of the shift lever assembly 10 is pivotally mounted by the pivot assembly 16 on a support housing tower 17 for axial shifting movement and on the shift shaft 105 for transverse selecting movement. The tower surrounds the shift lever assembly 10 and is secured by screws 18 to the top of the transmission tail shaft housing 20 around an opening 21 in the top of the tail shaft housing.

A dual boot seal 22 has an upper boot portion 23 having an inner seal ring 24 sealing the upper boot portion to the isolator 12 of the shift lever assembly 10 and has a lower boot portion 26 having an inner or central sealing ring portion 27 sealing the lower boot portion to the lower portion 14 of the shift lever assembly 10. At the outer perimeter of the upper and lower boot portions 23 and 26 are integrally formed with a common outer edge sealing ring 28 which is clamped to a vehicle floor portion, such as upper wall 29 of console 30. The sealing ring 28 and floor covering or carpet 31 are clamped by a suitable bezel 32 secured to wall 29 by screws 33. Within the boot seal ring 28 the wall 29 has a suitable opening 34 permitting complete freedom of movement of the shift lever assembly 10 during shifting operation and the dual boot seal 22 completely surrounds the shift lever assembly 10 and provides a dual sealing and silencing closure for the opening 34 in floor or wall 29. The boot portions 23 and 26 have an annular corrugated form to permit complete freedom of movement in the shift lever assembly 10 without straining these boot portions.

The pivot assembly 16, for pivotally mounting the lever assembly 10 for shifting movement on the shift tower 17, has a pivot bracket 36 formed of a three sided part 37 forming, as viewed in FIG. 1, the front (left) side wall 38, the back as far side wall 39 and the rear (right) side wall 41 and a separate one side wall piece forming the near side wall 42 welded at the front edge to the front side wall 38 by weld 43 and at the rear to the rear side wall by the weld 44. These four side walls form a rectangular tubular member through which the lower portion 14 of the gear shift lever assembly 10 extends. The front side wall 38 and the rear side wall 42 have respectively at the top or upper portion inwardly facing opposed guide portions 46 and 47 and at the bottom similar guide portions 48 and 49 which respectively engage the front and rear sides 51 and 52 of the basically square shift lever portion 14. These front and rear sides or guide portions 51 and 52 of shift lever portion 14 are slightly rounded in the cross section of the lever so that during axial shift movement of lever 14, small turning movement of lever 14 about its longitudinal axis during axial shifting movement is permitted without binding against these guide portions and the front and rear sides of the shift lever always engage these guide portions to move bracket 36 conjointly with the shift lever without lost motion and that during transverse shift selecting movement of the shift lever 14, there is smooth sliding movement between the rounded portion of the shift lever and these guide portions. The pivot bracket 36 has in the back side wall 39 and the near side wall 42 respectively, pivot apertures 53 and 54 for pivotally mounting the pivot bracket on the outer diameter of the axially aligned pivot pins 56 and 57 which are fixed in apertures 58 and 59 in the back wall 61 and near wall 62 of the shift tower 17. The serrations 63 and 64 on the pins 56, 57 are press fitted into apertures 58 and 59 to secure the pivot pins 56, 57 to the tower walls.

The back and near tower walls 61 and 62 have respectively flat guide surface bosses 66 and 67 facing the outer face of the back side wall 39 and the near side wall 42 of the pivot bracket 36 to permit free pivotal movement of the pivot bracket on the pivot pins 56, 57, and a spring washer 68 biases the bracket to contact one boss to prevent lateral movement on the pivot bracket and to assist the pivot pins in providing support against lateral tilting of the pivot bracket 36.

A guide and stop pin 71 is press fitted in a bore 72 extending through the shift lever 14 from the front to the rear sides 51, 52 and thus secured to the shift lever 14. The pin 71 extends forwardly into the cross slot 73 in the front side wall 38 and rearwardly into the cross slot 74 in the rear side wall 41. The cross slots 73 and 74 have a vertical height substantially equal to the diameter of pin 71 to prevent vertical movement of the lever 14 relative to the pivot bracket 36 and to permit cross or transverse selecting movement of the lever 14 relative to the pivot bracket 36 as limited by the ends of the cross slots 73 and 74 to permit movement of the lever in the selecting direction between a first, NI, second NII and third neutral position NIII as shown.

An anti-rattle coil spring 76 has an upper hook 77 engaging in a bore 78 in the top of pin 71 and a lower hook 79 engaging in a hole 81 in the rear wall 41 or alternatively on a projection extending from the rear wall to hold the pin 71 in engagement with the lower side of cross slot 74 to prevent rattling. A centering device 82 normallly biases the pin 71 and shift lever 14 to the second neutral position NII for second, third ratio drive shifting to positions 2, 3 as shown in FIG. 4. The centering device 82 has a bracket 83 with legs 84 and 86 at each side engaging the front wall 38, and is secured in position on front wall 38 by screws 87, 88. The bracket 83 has a centering tongue 89 extending upwardly to a point just below the pin 71 and then axially with the pin into a slot 91 in the front wall 38. The tongue 89 and slot 91 have a width equal to the width of pin 71. A back side and a near side coil centering spring 92 and 93 each have a coil portion respectively on the shank portion of back screw 87 and front screw 88 and a tail portion engaging the adjacent bracket leg 84 and 86 and an actuator portion 94 and 96 extending vertically and in the centered second neutral position NII both engaging both the tongue 89 and the pin 71 to bias the pin and shift lever 14 in the second neutral position and to permit movement to either first neutral position NI or third neutral position NIII against the centering spring bias.

The lower end of the shift lever portion 14 is bifurcated or forked to provide legs or tines 101 and 102 on opposite transverse sides of a shift saddle block 103 which has in the upper portion a bore 104 receiving the shift shaft 105 and is secured by the securing pin 106 driven in a through hole in block 103 and shift shaft 105, to secure the block 103 on shift shaft 105. The tines 101, 102 have flat parallel internal guide surfaces 107, 108 respectively in bearing engagement with the flat parallel external guide surfaces 109, 110 of block 103 so the shift shaft rotates conjointly with the block 103 and shift shaft about the axis of rotation of the shift shaft. Since these guide surfaces are mainly spaced below the shift shaft there is a long lever arm to the bottom portion of the guide surfaces to provide a low load density on these guide surfaces. The bottom end of each of the tines 101 and 102 has a rounded shift operating cam portion 111 and 112 each fitting without play during shifting movement between a pair of lugs 113 and 114, one pair on each side of block 103 so that forward and rearward shifting movement of the shift lever 14 is translated to axial forward and rearward movement of the shift block 103 and shift shaft 105. The shift shaft 105 is rotatably and axially slidably mounted at the rear end in a bore 116 in rear wall 117 and in a bore 118 in front wall 119 of tail shaft housing 20. A conventional ball detent 121 is shown in front wall 119 but may be any conventional detent which detents and limits movement of shift shaft 105 from the neutral positions forwardly to the reverse, second and fourth drive positions and rearwardly to the first, third and fifth drive positions. The detent 121 has a spring 122 in a bore 123 in front wall 119 biasing a ball 124 into grooves 125, the central groove for neutral positions and the other grooves to limit forward or reverse movement in the drive positions. The conventional shift shaft linkage in the gear box functions in response to, and permits only a modified or double H shift pattern. While such shift patterns are represented as H patterns, since the corners of all parts are rounded or bevelled, transfer movement between the neutral path, the cross bar of the H and the shift paths, the vertical lines of the H, is curved which has the effect of permitting a sloped neutral movement.

Figure 5:
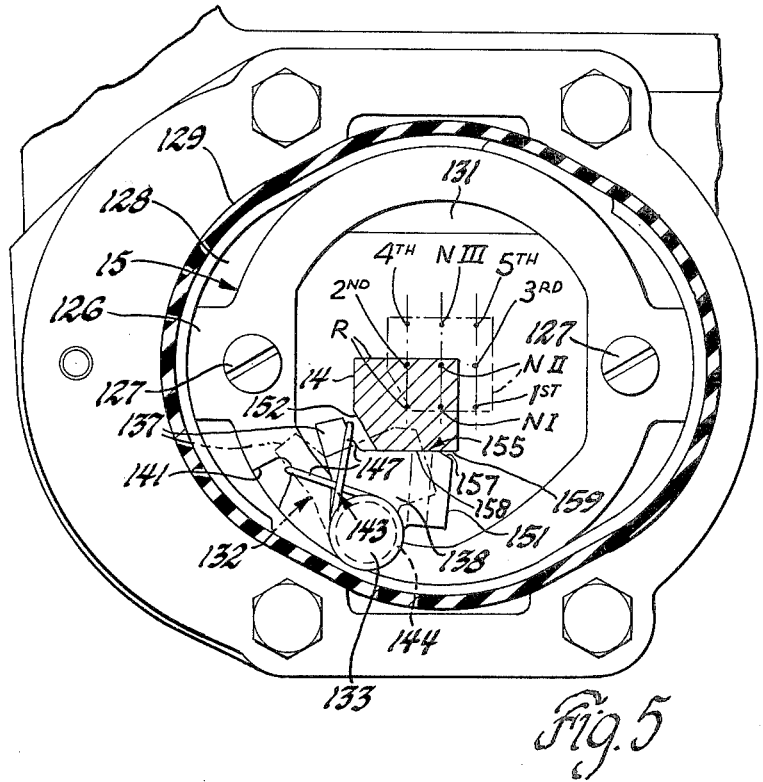
FIG. 5 is a partial sectional view like FIG. 4 showing the inhibitor operation on a shift from first drive position to second drive position.

The inhibitor assembly 15 has an inhibitor ring plate 126 secured by suitable fasteners 127 to the top wall 128 of the tower 17. A boot seal 129 is used to seal a central opening 131 in the top wall 128 through which the shift lever 14 extends. Referring to FIGS. 4 and 5, the rotary inhibitor cam 132 is pivotally mounted on the ring plate 126 by a pin 133 having a shoulder 134 guiding the inhibitor cam 132 in contact with the inhibitor ring plate 126. The pin 133 passes through plate 126 and is press fit secured in a bore 136 in tower 17. The inhibitor cam 132 has a centering arm 137 and a cam arm 138. The ring plate 126 has a recess 141 providing a centering stop portion 142 having the same width as the centering arm 137. A centering spring 143 has a coil portion 144 coiled around pin 133 and held in place by a head 146 on pivot pin 133 against the inhibitor cam 132. The centering spring 143 has a pair of fingers 147 having at the end of each finger a transversely extending portion 148 biased to engage opposite sides of both the centering arm 137 and the fixed centering stop portion 142 of the ring plate 126 to bias the inhibitor cam 132 to the centered position shown in dot dash lines in FIGS. 4 and 5 and to permit movement against the centering spring bias to the reverse inhibiting position shown in full lines in FIG. 4 and the reverse or first shift position shown in full lines in FIG. 5. In FIGS. 4 and 5, dots indicate the position of the center of shift lever 14 in the plane of the inhibitor cam 132 in each shift position first, second and third neutral positions NI, NII and NIII and reverse, first, second, third, fourth and fifth drive positions, R, 1st, 2nd, 3rd, 4th and 5th and the shift lever 14 is shown in section and phantom dot dash lines in selected positions referenced with the same legends and referred to in the explanation of the inhibitor cam operation. The hand knob (not shown) has the same positions with the distance between the positions increased by the lever arm of the shift lever. Since the lever assembly 10 for selecting movement, pivots near the lower end at the shift shaft center and this pivot is a long distance from the plane of the inhibitor assembly 16, the selecting movement distances of the hand knob are increased a small distance as compared to the hand knob shifting movement distances relative to these distances in the plane of the inhibitor cam 132. Since the lever assembly 10 is pivoted on the pivot bracket 36 and pivot pins 56, 57 nearer the plane of the inhibitor cam for shifting movement than the selecting movement pivot on shift shaft 105, the shifting movement distances are increased a greater amount than the selecting movement distances. The inhibitor cam 132 has on the cam arm 138 an inhibitor cam surface or reverse blocking cam surface 151 which cooperates with the inhibitor or blocking cam surface 152 on the shift lever portion 14 to engage and prevent a shift directly from the first speed drive position 1st, dot dash lines, FIG. 4, to the reverse drive speed position, R, solid lines FIG. 5, and inhibits such movement at the first neutral position NI solid lines, FIG. 4, and guides the shift lever to the second neutral position NII indicated by the dot NII. The cam arm 138 has a support shoulder portion 153 which engages the edge 154 of plate 126 to stop the inhibiting cam 132 in the inhibiting position and to provide the high reaction force required to inhibit shift lever movement. The lower portion of cam arm 138, coextensive with its inhibitor cam surface 151, has a bevel 156 on the lower side so cam surface 151 is aligned with the pivotal mounting of rotary cam 132 on pivot pin 133 to substantially eliminate tilting forces on the rotary cam. The cam arm 138 also has an unblocking or uninhibiting cam surface 155 including a sloped portion 157 and a straight portion 158 cooperating with an uninhibiting flat cam portion 159 provided by the side of lever 14, so that during a shift from the second neutral position NII, dot dash lines FIG. 5, to the first neutral position NI, the uninhibiting flat cam surface 159 on the lever first flatly contacts the sloped cam surface 157 on the inhibitor cam 132 and rotates the rotary inhibitor cam 132 to uninhibiting position so that the cam surfaces 159 on the lever and straight cam surface 158 on the inhibitor cam engage in surface engagement so that the shift lever may be shifted from the first neutral NI position to either reverse position R, solid lines FIG. 5, in which the inhibitor cam 132 is retained in the unblocking position or shifted to first speed drive position 1st, dot dash lines FIG. 4, in which the cam surfaces 159 and 158 on the lever and cam arm are disengaged permitting the centering spring to return the inhibitor cam 132 to the centered position. Then on movement from the first speed position 1st, dot dash lines FIG. 4, toward the first neutral position, the tapered inhibiting cam surface 152 on the lever engages the inhibiting cam surface 151 on the inhibitor cam 132 in the centered position and causes rotation of the inhibitor cam 132, to the full line inhibiting position in FIG. 4 which guides and requires movement of the shift lever 14 from the first neutral position NI, solid lines FIG. 4, to the second neutral position indicated by dot NII and prevents shifting into reverse position. The inhibiting cam surfaces 151 and 152 on the inhibitor cam 132 and shift lever 14 are sloped within the limits of the sloped movement from first neutral to second neutral positions permitted by bevelled edges of the gear box shift linkage between shift shaft 105 and the gearing. Thus the force applied by the operator in shifting out of reverse on contacting the inhibitor cam 132 has a reaction component causing the shift lever to move in a sloped path through the cross-over or selection movement path from first to second neutral positions. When the shift lever is in the second neutral position, conventional shifting is permitted to either second or third position or to third neutral position NIII from which shifting to fourth or fifth position is permitted or a return to first neutral position NI for a shift to either reverse position R or first position 1st.

Operation

The operation of this shift lever assembly, though generally apparent from the description of the structure, is now summarized. The shift lever assembly 10 is normally biased by the centering coil springs 92 and 93 to the second neutral position NII. The operator can move the shift lever to either the first or second neutral positions NI and NII against the bias of one of the centering springs until the guide and stop pin 71 abuts the ends of slots 73 and 74 in pivot bracket 36. The pivot bracket guide portions 46, 47, 48 and 49 only permit straight transverse selecting movement relative to the pivot bracket. The conventional detent 121 and transmission gear box controls only permit selecting movement between the neutral positions and permit shifting movement at the neutral positions to the drive positions. During selecting movement of lever 10 the tines 101 and 102 have their guide surfaces 107 and 108 in contact with the guide surfaces 109 and 110 on opposite sides of saddle block 103 fixed on shift shaft 105 to conjointly rotate both the lever 10 and shift shaft 105 about the axis of rotation of the shift shaft. This arrangement uses the full lever length of the lever 10 to provide a high mechanical advantage so minimal manual effort is required. The guide surfaces on the lever tines have a large area engaging the guide surfaces on the saddle block to provide a low friction connection without play or lost motion so a small amount of rotation of the shift shaft 105 for the neutral positions is accurately provided and prevents any significant turning of the lever assembly about its longitudinal axis.

The shift lever 10 in any neutral position may be shifted forwardly or rearwardly to the drive positions.

During this shifting movement, the pivot bracket 36, due to the contact between its guide surfaces 46, 47, 48 and 49 and lever side faces 51 and 52 moves with the lever and pivots on pivot pins 56, 57 on tower 17 and the lower end cams 111, 112 engage and are confined between a pair of lugs 113, 114 to shift the shift shaft axially to drive positions. Thus the selecting and shifting movement of the shift lever 10 feels firm to the operator and his movement of the shift lever is accurately and efficiently transferred to the shift shaft 105 for shifting the transmission.

The automatic inhibitor responsive to movement out of first drive position 1st, dot dash lines FIG. 4, prevents shift movement directly to reverse position R, solid lines FIG. 5. when the shift lever 14 is in first drive position, the rotary inhibitor cam 132 is in the centered position, dotted lines FIG. 4. On a shift from first drive position 1st, as the shift lever approaches the first neutral position NI, the lever inhibiting cam surface 152 engages the rotary cam inhibiting cam surface 151 and rotates the inhibitor cam 132 to the inhibiting position, solid lines FIG. 4, with these cam surfaces 151, 152 in flat surface to surface engagement. Since the entrance into the neutral path is a zone represented by dot NI, due to the beveling of the corners of the parts of the transmission gear box linkage, this engagement occurs on the entrance of shift lever 14 into this zone. The cam surfaces 151, 152 are sloped so with the inhibitor cam 132 in inhibiting position the shift lever 14 starts moving into the neutral path from first to second neutral positions and moves diagonally toward second neutral position crossing the center of this path centrally between these neutral positions and enters the second neutral position zone on the side adjacent the second drive position 2nd for a subsequent shift normally to second drive position and then conventionally to higher drive positions, i.e., 3rd etc. During this inhibiting operation, the inhibiting cam 132 has a shoulder 153 engaging a side wall surface or edge 154 of plate 126 to support the inhibiting cam and provide a reaction force so the manually applied shifting force shifting out of first drive position automatically provides a resultant force moving the shift lever in the selecting path from the first neutral to the second neutral position.

When the shift lever 14 is in the second neutral position NII, dot dash lines FIG. 5, the inhibitor cam 132 is in the central position, dot dash lines FIG. 5, and on movement of the shift lever 14 its uninhibiting cam surface 159 first engages sloped cam surface 157 on cam arm 138 to rotate rotary inhibiting cam 132 to the uninhibiting position, solid lines FIG. 5, to permit an initial shift of lever 14 to either reverse drive position R, solid lines FIG. 5, or first drive position 1st, dot dash lines, FIG. 4. A subsequent shift from reverse drive position is not inhibited as the uninhibiting cam surfaces 158 and 159 remain in contact in reverse drive position. A subsequent shift from first drive position is inhibited as explained above. Shifting between other positions, second and third neutral and second to fifth drive, is not inhibited.

While in the above description of the preferred embodiment word of reference to the position of parts of the shift linkage assembly as shown on the drawing such as near, rear front, rear, upper, lower, forward and rearward, etc., have been used for convenient clear reference to the drawing which shows this assembly in one conventional position, it will be appreciated that this assembly can be used in other positions and that these words merely describe the relative position of these parts.

It will be appreciated that the invention described with reference to a preferred embodiment may be used in modified form.

It is claimed:

1. In a transmission shift control linkage; a support; a shift shaft mounted on said support for reciprocating shifting movement along its axis and rotary selecting movement about its axis and having connecting means thereon; a shift lever having a handle end and connecting means at the opposite end connected to said connecting means on said shift shaft to pivotally mount said lever on said shift shaft for selecting pivotal movement about the shift shaft axis conjointly with said rotary selecting movement of said shift shaft; a pivot bracket located at an intermediate portion of said shift lever; shifting pivot means between said pivot bracket and said support to mount the pivot bracket for shifting pivotal movement about an axis transverse to the longitudinal axis of said shift lever; guide and stop means on said pivot bracket and said shift lever to guide said lever for selecting movement relative to said pivot bracket and to limit said selecting movement at end neutral positions and to prevent relative shifting movement of said shift lever and said pivot bracket for conjoint pivotal shifting movement of said shift lever and pivot bracket; said connecting means on said shift lever and shift shaft having guide means to prevent turning of said shift lever about its longitudinal axis and motion transfer means to transfer pivotal shifting movement of said shift lever to axial shifting movement of said shift shaft.

2. In a transmission shift control linkage; a support; a shift shaft mounted on said support for reciprocating shifting movement along its axis and rotary selecting movement about its axis and having a saddle block fixed thereon; a shift lever having a handle end and a fork at the opposite end straddling said saddle block to pivotally mount said lever on said shift shaft for selecting pivotal movement about the shift shaft axis conjointly with said rotary selecting movement of said shift shaft; a pivot bracket having an enclosing side wall structure and open ends located around an intermediate portion of said shift lever; shifting pivot means between opposite portions of the enclosing side wall structure and said support to mount the pivot bracket for shifting pivotal movement about an axis transverse to the longitudinal axis of said shift lever; guide and stop means on said pivot bracket and said shift lever to guide said lever for selecting movement relative to said pivot bracket to limit said selecting movement at end neutral positions and to prevent relative shifting movement of said shift lever and said pivot bracket for conjoint pivotal shifting movement of said shift lever and pivot bracket; said fork and saddle block having guide means to prevent turning of said shift lever about its longitudinal axis and motion transfer means to transfer pivotal shifting movement of said shift lever to axial shifting movement of said shift shaft.

3. The invention defined in claim 2 and said guide and stop means including opposed slots in said side wall structure, a pin fixed in said shift lever extending into said slots to prevent relative axial movement between said shift lever and pivot bracket and to limit selecting movement of said shift lever and guide surfaces on said pivot bracket engaging said shift lever for straight guidance of selecting movement of said shift lever and to prevent relative movement for conjoint shifting movement between said shift lever and pivot bracket; a centering abutment on said pivot bracket and centering springs on said pivot bracket engaging said centering abutment and pin to center said pin and shift lever in the second neutral position.

4. In a transmission shift control linkage; a support; a shift shaft mounted on said support for reciprocating shifting movement along its axis and rotary selecting movement about its axis and having a saddle block fixed thereon; a shift lever having a handle end and a fork at the opposite end straddling said saddle block to pivotally mount said lever on said shift shaft for selecting pivotal movement about the shift shaft axis conjointly with said rotary selecting movement of said shift shaft; a pivot bracket having an enclosing side wall structure and open ends located around an intermediate portion of said shift lever; shifting pivot means between opposite portions of the enclosing side wall structure and said support to mount the pivot bracket for shifting pivotal movement about an axis transverse to the longitudinal axis of said shift lever; guide and stop means on said pivot bracket and said shift lever to guide said lever for selecting movement relative to said pivot bracket to limit said selecting movement at end neutral positions and to prevent relative shifting movement of said shift lever and said pivot bracket for conjoint pivotal shifting movement of said shift lever and pivot bracket; said fork and saddle block having guide means to prevent turning of said shift lever about its longitudinal axis and motion transfer means to transfer pivotal shifting movement of said shift lever to axial shifting movement of said shift shaft; said shift lever and shift shaft having selecting movement between a first neutral position for reverse drive and first drive positions and a second neutral position for second drive and third drive position and shifting movement from said first neutral position in opposite directions to either reverse drive position or first drive position and from second neutral position in opposite directions to either second drive position or third drive position and inhibitor means having an inhibitor member rotatably mounted on said support on an axis parallel to the longitudinal axis of said shift lever spring means to bias said inhibitor member to a central position and to permit limited rotary movement in one direction to an inhibiting position in stop engagement with said support and in the opposite direction to an uninhibiting position and cooperating cam surface means on said inhibitor member and shift lever operative in response to selecting movement of said shift lever from second neutral position to first neutral position to move said inhibitor member to uninhibiting position to permit free shifting of said shift lever from said first neutral position to either reverse or first drive position and operative in response to selecting movement of said shift lever from first drive position to first neutral position to move said inhibitor member to inhibiting position to inhibit a shift to reverse drive position and to guide the shift lever from first neutral position to second neutral position.

5. In a transmission shift control linkage: a support; transmission shift control means mounted on said support having selecting movement between a first neutral position and a second neutral position and shifting movement transverse to said selecting movement from said first neutral position and said second neutral position in one direction respectively to reverse drive position and second drive position and in the opposite direction respectively to first drive position and third drive position; a shift lever having connecting means operatively connecting said shift lever to said transmission shift control means and pivot means pivotally mounting said shift lever on said support for similar selecting movement in a selection path between a first neutral position and a second neutral position having a width permitting both straight and diagonal selecting movement and for shifting movement transverse to the selecting movement from said first neutral position and said second neutral position in one direction respectively in a reverse path to reverse drive position and in a second path to second drive position and in the opposite direction respectively in a first path to first drive position and in a third path to third drive position; and inhibitor means having a rotary inhibitor member and a pivot pin for rotatably mounting said inhibitor member on said support; spring means to bias said inhibitor member to a central position and to permit limited rotary movement from said central position in one direction to an inhibiting position and in the opposite direction to an uninhibiting position; stop means on said rotary inhibitor member and said support stopping and supporting said rotary inhibitor member in said inhibiting position; said shift lever having an uninhibiting cam face parallel to said reverse path and to said first path and a diagonally related inhibiting cam face in said selection path; said rotary inhibitor member having uninhibiting cam surface means cooperating with said uninhibiting cam face on selecting movement of said shift lever from said second neutral position to said first neutral position to rotate said rotary inhibitor member from said central position to said uninhibiting position and to hold said rotary inhibitor member in said uninhibiting position during shift lever shifting movement in said reverse path and to permit return of said rotary inhibitor member to said central position on shift lever shifting movement to said first drive position, and said rotary inhibitor member having an inhibiting cam surface cooperating with said inhibiting cam face on shift lever shifting movement from said first drive position toward said first neutral position to rotate said rotary inhibitor member from said central position to said inhibiting position to position said inhibiting cam surface diagonally for surface engagement with said inhibiting cam face to positively guide said shift lever in selecting movement in said diagonal path from said first neutral position to said second neutral position for shifting movement in said second path as a continuous movement from said first drive position to said second drive position.

* * * * *